United States Patent Office 2,753,336
Patented July 3, 1956

2,753,336
COBALT-CONTAINING AZO DYESTUFFS
Piero Maderni, Basel, Switzerland, assignor to Sandoz A. G., Basel, Switzerland, a Swiss firm
No Drawing. Application November 20, 1953,
Serial No. 393,497
Claims priority, application Switzerland
November 28, 1952
6 Claims. (Cl. 260—149)

The present invention relates to cobalt-containing azo dyestuffs.

A primary object of this invention is the embodiment of cobalt-containing azo dyestuffs of especial utility in the dyeing of wool, silk, leather and synthetic nitrogen-containing fibers, such as polyamide fibers (for example, nylon, perlon, etc.) from neutral or weakly acid dyebaths. This object is realized by the dyestuffs according to the present invention, which correspond to the formula

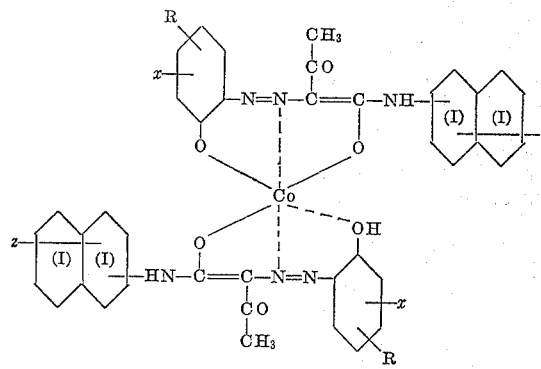

wherein R stands for a lower alkylsulfonyl group (e. g. methylsulfonyl, ethylsulfonyl, propylsulfonyl, etc.) or a sulfonic acid amide group ($-SO_2.NH_2$), the nitrogen atom of which may be substituted by a lower alkyl group (e. g. methyl, ethyl, propyl, etc.) which, in turn, may carry an hydroxyl or lower alkoxy group (e. g. methoxy, ethoxy, propoxy, etc.), $x$ stands for hydrogen, halogen (e. g. fluorine, chlorine, bromine), lower alkyl (e. g. methyl, ethyl, propyl, etc.) or nitro, and $z$ stands for hydrogen, methoxy, methylsulfonyl or sulfonic acid amide group substituted by lower alkyl (e. g. methyl, ethyl, propyl, etc.), and wherein the nuclei I may be partly or totally hydrogenated.

The new dyestuffs are obtained by coupling one mol of a diazotized aminobenzene compound of the formula

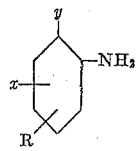

wherein $x$ and R have the above-mentioned significances, and $y$ stands for hydroxy or methoxy, with one mol of an acetoacetylaminonaphthalene compound of the formula

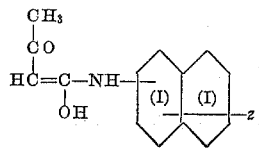

wherein $z$ has the previously-recited significance and, as aforementioned, the nuclei (I) may be partly or totally hydrogenated, and treating the thus-obtained monoazo derivative with a cobalt-yielding agent.

The coupling of the diazo compounds with the acetoacetylaminonaphthalenes is preferably carried out in alkaline medium. In many cases it is necessary to work with suspensions, since the acetoacetylaminonaphthalenes are difficultly soluble in water. Upon completion of the coupling, the resultant monoazo dyestuff is, in most cases, preciptated so that it is not necessary to salt it out from the alkaline mass. It is merely necessary to filter and to dry the precipitated product.

Suitable diazo compounds for use according to the present invention, comprise, for example, 1-hydroxy-2-amino-4-methylsulfonylbenzene,
1-hydroxy-2-aminobenzene-4-sulfonic acid amide,
1-hydroxy-2-aminobenzene-5-sulfonic acid amide,
1-hydroxy-2-amino-6-fluorobenzene-4-sulfonic acid amide,
1-hydroxy-2-amino-6-chlorobenzene-4-sulfonic acid amide,
1-hydroxy-2-amino-6-bromobenzene-4-sulfonic acid amide,
1-hydroxy-2-amino-6-methylbenzene-4-sulfonic acid amide,
1-hydroxy-2-amino-6-nitrobenzene-4-sulfonic acid amide,
1-hydroxy-2-amino-4-fluorobenzene-5-sulfonic acid amide,
1-hydroxy-2-amino-4-chlorobenzene-5-sulfonic acid amide,
1-hydroxy-2-amino-4-methylbenzene-5-sulfonic acid amide,
1-hydroxy-2-amino-4-nitrobenzene-5-sulfonic acid amide,
1-hydroxy-2-amino-4-fluorobenzene-6-sulfonic acid amide,
1-hydroxy-2-amino-4-chlorobenzene-6-sulfonic acid amide,
1-hydroxy-2-amino-4-methylbenzene-6-sulfonic acid amide,
1-hydroxy-2-amino-4-nitrobenzene-6-sulfonic acid amide, and derivatives thereof substituted at the nitrogen atom of the sulfonic acid amide group, for example, by the methyl group or the ethanol group. Particularly suitable in this regard, are the simplest representatives of the foregoing, namely, 1-hydroxy-2-aminobenzene-4-sulfonic acid amide, 1-hydroxy-2-aminobenzene-5-sulfonic acid amide, 1-hydroxy-2-aminobenzene-4-sulfonic acid methyl amide, 1-hydroxy-2-aminobenzene-5-sulfonic acid methylamide, 1-hydroxy-2-aminobenzene ethanolamide and 1-hydroxy-2-aminobenzene-5-sulfonic acid ethanolamide. Similarly useful are also the corresponding 1-methoxybenzene compounds.

Suitable acetoacetylaminonaphthalenes for the purposes of the present invention, which naphthalenes may be partly or totally nuclearly hydrogenated, comprise inter alia 1-acetoacetylaminonaphthalene, 2-acetoacetylaminonaphthalene, 1-acetoacetylamino-5,6,7,8 - tetrahydronaphthalene, 2-acetoacetylamino-5,6,7,8-tetrahydronaphthalene, 1-acetoacetylaminodecahydronaphthalene, 2 - acetoacetylaminodecahydronaphthalene, etc.

The metallization of the monoazo compounds is advantageously carried out with cobalt acetate, cobalt formate or cobalt sulfate, in aqueous suspension or solution or in organic medium, for example in formamide or in the melt of an alkaline metal salt of a low molecular aliphatic monocarboxylic acid. In the latter case, use may also be made of insoluble cobalt compounds, such for example as cobalt hydroxide and cobalt carbonate. Metallization in aqueous caustic alkaline medium is very advantageous, the metal salt being added in the presence of such compounds as keep cobalt dissolved in complex combination in caustic alkaline medium, i. e. in the presence of compounds such as tartaric acid, citric acid and lactic acid. The metallization in aqueous caustic alkaline solution may also be carried out by simple addition of aqueous cobalt salt solutions. In the event that the monoazo compound to be metallized contains a methoxy group as the substituent capable of metal complex formation, then the metallization preferably takes place with splitting of the said methoxy group. Such splitting is advantageously carried out in organic solvents, for example glycols such as ethylene glycol, ethylpolyglycol or butylpolyglycol, if necessary in the presence of an acid-binding agent such as sodium acetate. Particularly valuable cobalt-containing azo dyestuffs are obtained when approximately one atom of cobalt is used for each two molecules of monoazo compound.

The obtained cobalt-containing azo dyestuffs are precipitated from the metallization solutions generally with the aid of sodium chloride, after which they are filtered, washed and dried. They are characterized by an outstanding neutral affinity for fiber and dye wool and silk from neutral or weakly acid dyebaths in valuable yellow, level and full shades of excellent fastness to light and very good fastness to fulling and washing. The new dyestuffs are also excellently suitable for dyeing leather and, above all, for dyeing nitrogen-containing synthetic fibers, namely the so-called polyamide or superpolyamide fibers such as are marketed under the designations "nylon," "perlon," etc.

The following examples illustrate the invention without limiting the same. In these examples, the parts are parts by weight, the percentages are by weight and the temperatures are in degrees centigrade.

EXAMPLE 1

23.8 parts of 1-acetoacetylaminonaphthalene are dissolved in 750 parts of water with the aid of sodium hydroxide, while stirring vigorously. The resultant solution is adjusted to a pH value of about 11 by means of hydrochloric acid, after which 20 parts of sodium carbonate are added and the solution cooled down to 0–5°. Therein is then run the diazo suspension from 18.8 parts of 1-hydroxy-2-aminobenzene-4-sulfonic acid amide, and the reaction mass is stirred for 6–9 hours at about 5° and then for an additional 8 hours at room temperature (20–30°). The monoazo compound which precipitates is separated by filtration, and is dried at 90–95° under reduced pressure. It is a yellow powder which dissolves with yellow-orange coloration in dilute aqueous sodium hydroxide solution.

In order to form the cobalt-containing complex thereof, 8.5 parts of the said monoazo compound are suspended in 600 parts of water at 95°; to the resultant suspension there is then added a sufficient quantity of aqueous sodium hydroxide solution until an alkaline reaction (pH=11 to 11.5) is obtained, whereupon 2.8 parts of crystalline cobalt acetate are added. The reaction mass is then stirred for 15 minutes at 85–90° and is then allowed to cool to room temperature. The cobalt-containing azo dyestuff which precipitates is separated by filtration and is then suspended in 600 parts of water at 90–95°. By the addition of sodium hydroxide to the suspension, the latter is brought into solution; sodium chloride is added to such solution, which is then permitted to cool. Upon the addition of acetic acid to the cool solution, the cobalt complex compound precipitates; it is separated by filtration and is dried at 50–60° under reduced pressure. There is obtained a yellow-brown powder which is soluble with yellow coloration in hot water. The dyestuff dyes wool and synthetic polyamide fibers from a neutral to weakly acid bath in yellow shades which are fast to washing, fulling, perspiration and light. The dyestuff corresponds to the formula

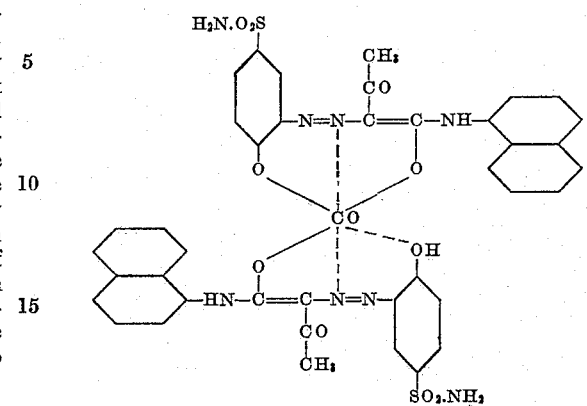

EXAMPLE 2

25.4 parts of 2-acetoacetylamino-5,6,7,8-tetrahydronaphthalene are admixed, after the manner described in Example 1, with the diazo suspension from 20.2 parts of 1-hydroxy-2-aminobenzene-4-sulfonic acid methylamide. Upon completion of the ensuing coupling, the formed monoazo compound is separated by filtration and is dried at 90–95° under reduced pressure. It is an orange-colored powder which dissolves with yellow coloration in dilute aqueous sodium hydroxide solution.

Metallization is carried out by suspending 8.8 parts of the thus-obtained monoazo compound in 800 parts of water at 95°. By adding sodium hydroxide to the suspension, the monoazo compound is brought into solution, and there is then added a cobalt-sodium-tartrate solution consisting of 2.8 parts of crystalline cobalt sulfate, 15.6 parts of aqueous tartaric acid solution of 4.8% strength and 3.7 parts of aqueous sodium hydroxide solution of 30% strength. The metallization mass is allowed to cool to room temperature, while continuing the stirring thereof. After the addition of 160 parts of sodium chloride and a small amount of acetic acid, the produced cobalt-containing azo dyestuff is precipitated out; it is separated by filtration and is dried at 50–60° under reduced pressure. The thus-obtained dyestuff, which corresponds to the formula

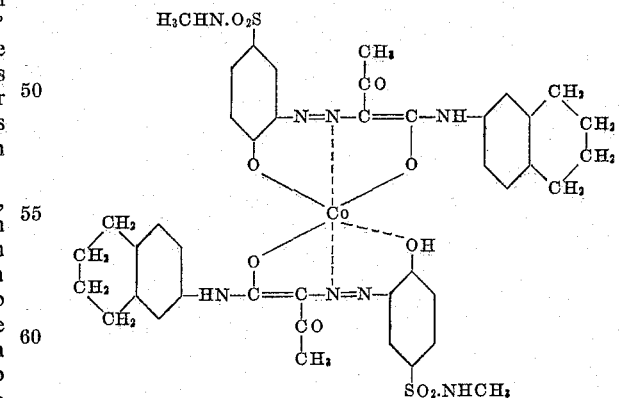

is a yellow-brown powder which dissolves in hot water with dark yellow coloration. The dyestuff dyes wool and synthetic polyamide fibers from a neutral to a weakly acid bath in pure yellow shades which are fast to washing, fulling, perspiration and light.

In the following table there are set forth additional dyestuffs which can be prepared after the manner described in Examples 1 and 2. These dyestuffs are characterized by their diazo and azo components, and by the shade of the dyeings of the cobalt complex compounds thereof on wool. These shades are identical with those obtained on silk and synthetic polyamide fibers.

Table

| Example No. (1) | Diazo Component (2) | Azo Component (3) | Shade of the Cobalt Complex Compound on Wool (4) |
|---|---|---|---|
| 3 | 1-hydroxy-2-aminobenzene-4-sulfonic acid amide. | 2-acetoacetylaminonaphthalene. | yellow. |
| 4 | ......do...... | 2-acetoacetylamino-5,6,7,8-tetrahydronaphthalene. | pure yellow. |
| 5 | ......do...... | 1-acetoacetylaminodecahydronaphthalene. | yellow. |
| 6 | 1-hydroxy-2-aminobenzene-4-sulfonic acid methylamide. | 1-acetoacetylaminonaphthalene. | Do. |
| 7 | ......do...... | 2-acetoacetylaminonaphthalene. | Do. |
| 8 | ......do...... | 2-acetoacetylaminodecahydronaphthalene. | Do. |
| 9 | 1-hydroxy-2-aminobenzene-4-sulfonic acid ethanolamide. | 1-acetoacetylaminonaphthalene. | Do. |
| 10 | ......do...... | 2-acetoacetylaminonaphthalene. | Do. |
| 11 | ......do...... | 1-acetoacetylamino-5,6,7,8-tetrahydronaphthalene. | Do. |
| 12 | ......do...... | 2-acetoacetylamino-5,6,7,8-tetrahydronaphthalene. | Do. |
| 13 | ......do...... | 1-acetoacetylaminodecahydronaphthalene. | Do. |
| 14 | 1-hydroxy-2-amino-4-methylsulfonylbenzene. | 1-acetoacetylaminonaphthalene. | Do. |
| 15 | ......do...... | 2-acetoacetylaminonaphthalene. | Do. |
| 16 | ......do...... | 1-acetoacetylamino-5,6,7,8-tetrahydronaphthalene. | Do. |
| 17 | ......do...... | 2-acetoacetylamino-5,6,7,8-tetrahydronaphthalene. | Do. |
| 18 | ......do...... | 2-acetoacetylaminodecahydronaphthalene. | Do. |
| 19 | 1-hydroxy-2-aminobenzene-5-sulfonic acid amide. | 1-acetoacetylaminonaphthalene. | brownish yellow. |
| 20 | ......do...... | 2-acetoacetylaminonaphthalene. | Do. |
| 21 | ......do...... | 1-acetoacetylaminodecahydronaphthalene. | Do. |
| 22 | 1-hydroxy-2-aminobenzene-5-sulfonic acid methylamide. | 1-acetoacetylamino-5,6,7,8-tetrahydronaphthalene. | Do. |
| 23 | ......do...... | 2-acetoacetylamino-5,6,7,8-tetrahydronaphthalene. | Do. |
| 24 | 1-hydroxy-2-aminobenzene-5-sulfonic acid ethanolamide. | 1-acetoacetylamino-5,6,7,8-tetrahydronaphthalene. | Do. |
| 25 | ......do...... | 2-acetoacetylamino-5,6,7,8-tetrahydronaphthalene. | Do. |
| 26 | ......do...... | 1-acetoacetylaminodecahydronaphthalene. | Do. |
| 27 | 1-hydroxy-2-aminobenzene-4-sulfonic acid amide. | 1-acetoacetylamino-1,2,3,4-tetrahydronaphthalene. | greenish yellow. |
| 28 | ......do...... | 2-acetoacetylamino-1,2,3,4-tetrahydronaphthalene. | yellow. |
| 29 | ......do...... | 1-acetoacetylamino-5,6,7,8-tetrahydronaphthalene. | greenish yellow. |
| 30 | ......do...... | 1-acetoacetylamino-2-methoxynaphthalene. | yellow. |
| 31 | ......do...... | 1-acetoacetylamino-4-methoxynaphthalene. | Do. |
| 32 | 1-hydroxy-2-aminobenzene-4-sulfonic acid methylamide. | 1-acetoacetylamino-5-methylsulfonylnaphthalene. | Do. |
| 33 | 1-hydroxy-2-amino-4-chlorobenzene-5-sulfonic acid amide. | 1-acetoacetylaminonaphthalene. | reddish yellow. |
| 34 | 1-hydroxy-2-aminobenzene-5-sulfonic acid amide. | 2-acetoacetylaminonaphthalene. | Do. |
| 35 | 1-hydroxy-2-amino-6-methylbenzene-4-sulfonic acid amide. | 2-acetoacetylamino-5,6,7,8-tetrahydronaphthalene. | yellow. |
| 36 | ......do...... | 1-acetoacetylaminonaphthalene. | Do. |
| 37 | 1-hydroxy-2-amino-6-nitrobenzene-4-sulfonic acid ethylamide. | 2-acetoacetylaminonaphthalene. | orange. |
| 38 | 1-hydroxy-2-amino-6-nitrobenzene-4-sulfonic acid isopropylamide. | 1-acetoacetylaminonaphthalene. | Do. |
| 39 | 1-hydroxy-2-aminobenzene-4-sulfonic acid amide. | 1-acetoacetylaminonaphthalene-5-sulfonic acid methylamide. | yellow. |
| 40 | 1-hydroxy-2-amino-4-tert. butylbenzene-6-sulfonic acid amide. | 1-acetoacetylaminonaphthalene-4-sulfonic acid ethanolamide. | Do. |
| 41 | 1-hydroxy-2-amino-6-bromobenzene-4-sulfonic acid amide. | 1-acetoacetylamino-4-methylsulfonylnaphthalene. | Do. |
| 42 | 1-hydroxy-2-aminobenzene-4-sulfonic acid-(3'-hydroxy)-propylamide. | 1-acetoacetylamino-5,6,7,8-tetrahydronaphthalene. | Do. |
| 43 | 1-hydroxy-2-aminobenzene-4-sulfonic acid-(2'-methoxy)-ethylamide. | 2-acetoacetylamino-1,2,3,4-tetrahydronaphthalene. | Do. |
| 44 | 1-hydroxy-2-aminobenzene-4-sulfonic acid-(3'-methoxy)-propylamide. | 1-acetoacetylaminonaphthalene. | Do. |

Formulae of representative dyestuffs of the preceding table are for instance:

EXAMPLE 5

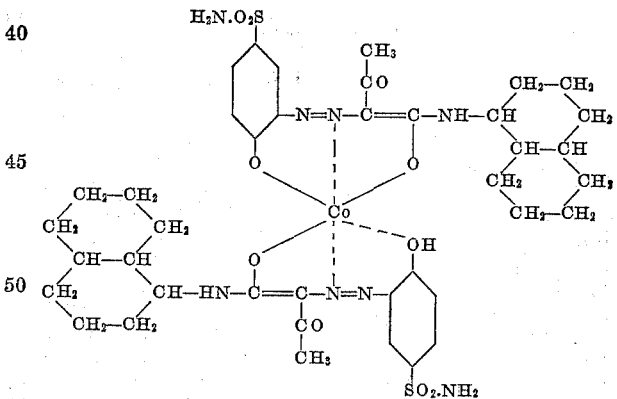

EXAMPLE 6

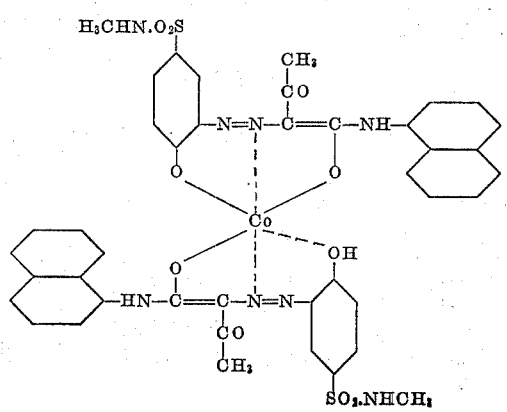

EXAMPLE 7

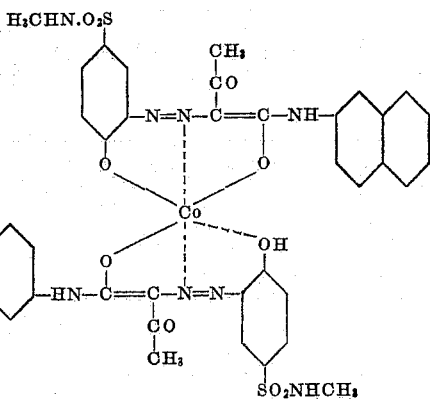

EXAMPLE 16

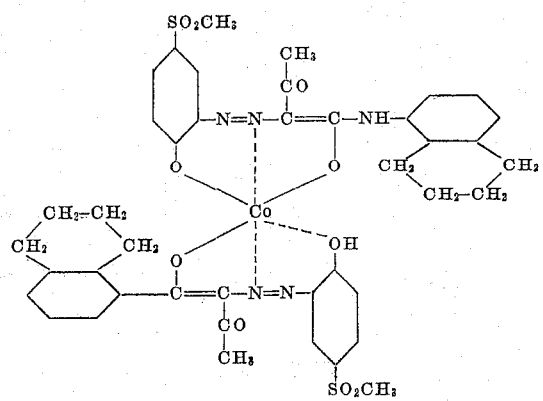

EXAMPLE 45

The cobalt-containing azo dyestuff of Example 6 can also be obtained by first preparing the metal-free monoazo compound by coupling the diazo compound from 21.6 parts of 1-methoxy-2-aminobenzene-4-sulfonic acid methylamide with 23.8 parts of 1-acetoacetylaminonaphthalene. To produce the cobalt complex, the monoazo compound is heated for 8 hours to 130–132° with 16 parts of crystalline cobalt sulfate and 40 parts of crystalline sodium acetate in 400 parts of ethylpolyglycol. After cooling to room temperature, the reaction mass is poured into saturated aqueous sodium chloride solution and the precipitated cobalt compound separated by filtration. The so-obtained dyestuff paste is then dissolved in dilute aqueous sodium hydroxide solution and the resultant solution filtered. By adding sodium chloride and sodium bicarbonate to the filtrate, the cobalt-containing azo dyestuff is reprecipitated, after which it is separated by filtration and dried at 90–95° under reduced pressure. It is identical with the product obtained according to Example 6.

EXAMPLE 46

A dyebath is prepared which contains 1.4 parts of the cobaltiferous azo dyestuff of Example 1 and 5000 parts of water. 100 parts of nylon fabric are entered into the bath at 40°, 2 parts of concentrated acetic acid are added, and the bath brought to boiling in the course of 15 minutes. Thereupon an additional 2 parts of concentrated acetic acid are added to the bath and the temperature of the latter maintained at 100° for one hour. After cooling slightly, the dyed material is withdrawn from the bath, rinsed thoroughly and dried. Wool may be dyed in similar manner.

Having thus disclosed the invention, what is claimed is:

1. A cobalt-containing azo dyestuff which corresponds to the formula

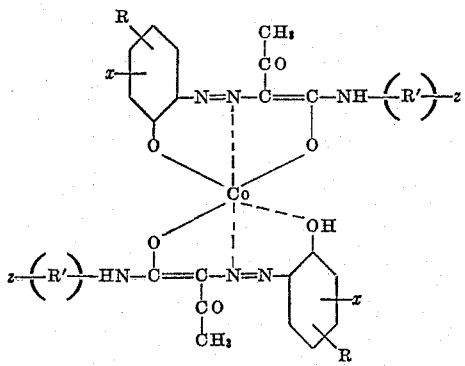

wherein R stands for a member selected from the group consisting of —$SO_2$.lower alkyl, —$SO_2.NH_2$, —$SO_2$.NH.-lower alkyl, —$SO_2$.NH.lower hydroxyalkyl and —$SO_2$.-NH.lower alkoxyalkyl, R' stands for a member selected from the group consisting of naphthalene and hydrogenated naphthalene radicals, $x$ stands for a member selected from the group consisting of hydrogen, halogen, lower alkyl and nitro, and $z$ stands for a member selected from the group consisting of hydrogen, methoxy, methylsulfonyl and —$SO_2$.NH.lower alkyl.

2. The cobalt-containing azo dyestuff which corresponds to the formula

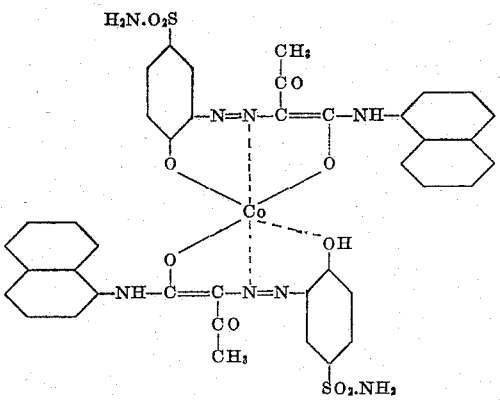

3. The cobalt-containing azo dyestuff which corresponds to the formula

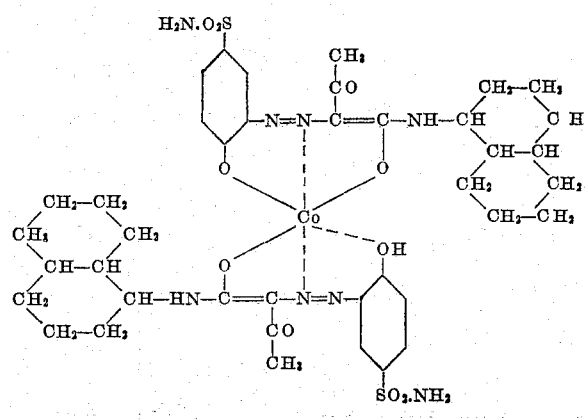

4. The cobalt-containing azo dyestuff which corresponds to the formula
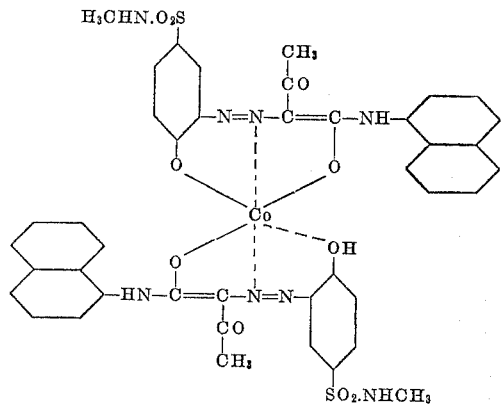
5. The cobalt-containing azo dyestuff which corresponds to the formula
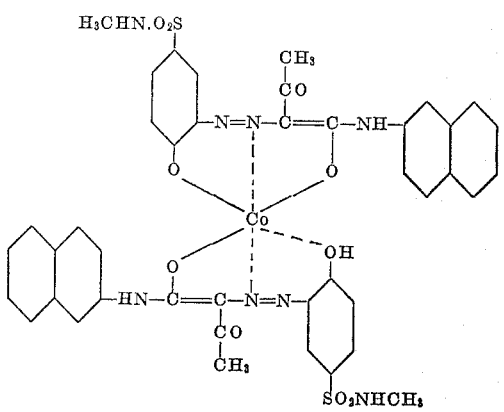
6. The cobalt-containing azo dyestuff which corresponds to the formula
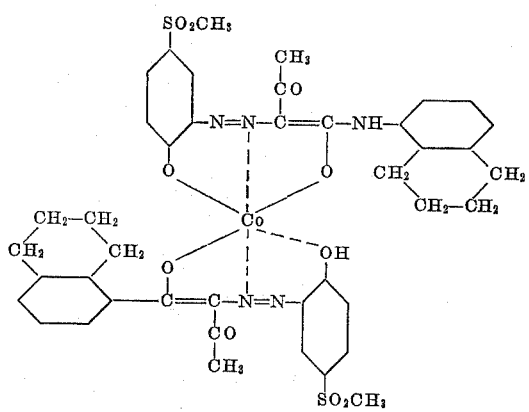
References Cited in the file of this patent
UNITED STATES PATENTS
| | | |
|---|---|---|
| 2,305,095 | Mackenzie | Dec. 15, 1942 |
| 2,551,056 | Schetty | May 1, 1951 |